March 14, 1961    R. T. CLEARY    2,975,337

SLOW ACTING RELAY-TRANSISTOR COMBINATION

Filed July 31, 1958

INVENTOR.
ROBERT T. CLEARY
BY
ATTY.

United States Patent Office 2,975,337
Patented Mar. 14, 1961

2,975,337

SLOW ACTING RELAY-TRANSISTOR COMBINATION

Robert T. Cleary, Lockport, Ill., assignor to Automatic Electric Laboratories, Inc., a corporation of Delaware Filed July 31, 1958, Ser. No. 752,347

8 Claims. (Cl. 317—142)

This invention relates to a method of obtaining slow action of relay devices.

Numerous methods have been proposed for rendering relays slow acting, that is, for delaying the operation and/or release of relays. In many instances relatively short delays are required. For example, in the case of many telephone circuits the operation or release of relays may be made sufficiently slow by providing the relay core with a copper sleeve or a copper slug. There are, however, a number of instances where the actuation of a relay must be delayed by a time interval greater than may be obtained by means of a sleeve or a slug.

Such longer release times may be obtained by mechanical means, e.g., by equipping the relay with a weighted spring or vibrating reed. However, such mechanical expedients are cumbersome and expensive, and it is difficult to vary the time delays obtainable by those mechanical means. It has also been proposed to combine a relay with a large-value capacitor, usually an electrolytic capacitor, thereby relying on the RC time constant of the circuit involved. However, capacitors of this kind require considerable mounting space and are relatively unstable, so the delays afforded by these capacitors vary over a wide range with age, ambient conditions, etc.

It is, therefore, an object of this invention to provide simple, inexpensive, and stable arrangements for obtaining slow operation and/or release of a relay.

It is a further object of this invention to provide a simple, inexpensive, and stable method of varying the operate and/or release time of a relay.

It is a further object of this invention to provide a novel and improved interrupter circuit relying on the slow operation and release of a relay.

According to the principal feature of the invention a transistor is used in combination with a relay which has two windings, one connected in the output circuit of the transistor, and the other connected in the input circuit of the transistor, in such a way that a negative feedback is obtained.

No capacitors are required, so that the arrangements according to this invention do not depend on the charging or discharging of such capacitors to provide time delay. This avoids the above-mentioned disadvantages of capacitors and renders the circuit instantaneously available for reuse at the end of an operating cycle. Yet, considerable operate or release delays may be attained by the circuit principles of the invention. Variable resistors may be added for varying the operate or release time of the relay over an appreciable range if desired.

The invention, as to its method of operation, will best be understood by reference to the following specification taken in connection with the accompanying drawings. In these drawings.

Figure 1:
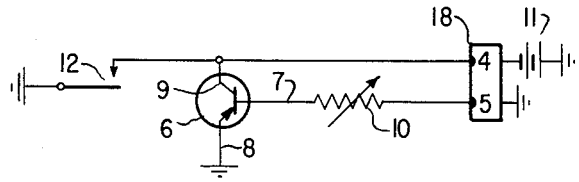
Fig. 1 is a circuit diagram showing how the principle of the invention may be used to make a relay slow to release.

In Fig. 1, the main or operating winding 4 of relay 18 is connected, in series with battery 11, in the output circuit of transistor 6. Emitter 8 of transistor 6 is connected to ground, and collector 9 of transistor 6 is connected to the IN terminal of winding 4. Battery 11 may be the battery of a conventional telephone exchange. Contact 12 may be operated by any circuit means external to Fig. 1. Auxiliary winding 5 of relay 18 is connected, in series with variable resistor 10, in the input circuit of transistor 6. More specifically, the IN terminal of winding 5 is connected through resistor 10 to base 7 of transistor 6 and the other terminal of this winding is connected to ground. With this connection of the two windings a negative feedback from winding 4 to winding 5 is obtained.

With the circuit shown in Fig. 1 a slow release is provider for relay 18 in the following manner:

When contact 12 is closed, winding 4 is directly energized in an obvious circuit, and the relay is operated. With contact 12 closed, the output of the transistor is simultaneously short-circuited. Any voltage induced in winding 5 at this time will be of such polarity as to make base 7 positive with respect to emitter 8, insuring that transistor 6 will be non-conductive with respect to its input circuit.

When contact 12 is opened, the original current path for winding 4 is broken, whereupon the flux in winding 4 begins to decrease. This changing flux in winding 4 induces a voltage in winding 5 of such a polarity that base 7 of transistor 6, which is a PNP transistor, is made negative with respect to emitter 8, so that the transistor tends to remain conductive. Thus, a new current path is established for winding 4, namely, through emitter 8 and collector 9 of transistor 6. As a result, current of the same sense continues to flow through winding 4, keeping the relay operated. Since operation of the transistor tends to keep the current in winding 4 flowing at its original value, the rate of change of flux decreases, causing the induced voltage in winding 5 to decrease, which causes transistor 6 to be less conductive. Eventually the flux decays to a point at which the transistor conducts insufficient current to caintain the relay in an operated condition, at which point the relay releases.

By varying the setting of series resistor 10 the current gain of transistor 6 may be controlled and the release delay of relay 18 may thereby be varied. Alternatively, resistor 10 may be connected in parallel with winding 5, rather than in series with it, to effect the same result as in the circuit shown in Fig. 1. Resistor 10 may be omitted, if desired.

Figure 2:
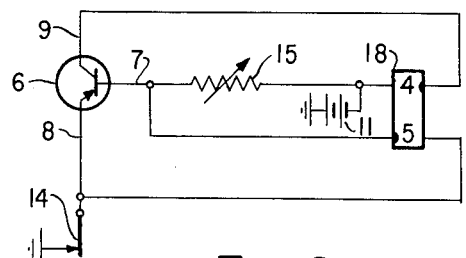
Fig. 2 is a circuit diagram showing how the principles of this invention may be used to make a relay slow to operate.

Fig. 2 shows a circuit whose purpose is to make a relay slow to operate.

In Fig. 2, the main or operating winding 4 of relay 18 is connected, in series with battery 11, in the output circuit of transistor 6. Collector 9 of transistor 6 is connected to the IN terminal of winding 4, and emitter 8 of transistor 6 is connected through contact 14 to ground.

The input circuit of transistor 6 is closed over auxiliary winding 5, base 7 being connected to the IN terminal of this winding and emitter 8 to the OUT terminal; also connected to the base-emitter path of the transistor is a biasing circuit which may be traced from ground at contact 14 through emitter 8, base 7, and variable resistor 15 to battery 11. With this connection of the two windings, a negative feedback from winding 4 to winding 5 is obtained.

Originally, contact 14 is open and the relay windings are deenergized, since the transistor input and output circuits are open-circuited, and, hence, the relay is not operated. When contact 14 is closed the above-mentioned biasing circuit extending over emitter 8 and base 7 of transistor 6 in shunt with winding 5 of relay 8, is completed. This bias makes base 7 negative with respect to emitter 8, and, since a PNP transistor is used, transistor 6 is thus made conductive. Current begins to increase from zero in winding 4. This increase in current causes an increase in flux in winding 4, and this changing flux induces a voltage in winding 5, this induced voltage opposing the biasing voltage of battery 11. This induced voltage in winding 5 tends to make base 7 positive with respect to emitter 8, thereby making transistor 6 less conductive, and thus reduces the current in winding 4. Therefore, it takes a relatively long time for a current large enough to operate the relay to build up in winding 4. Thus, a delay in the operation of the relay is effected.

Figure 3:
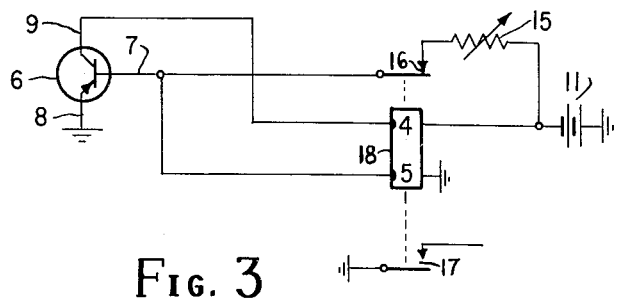
Fig. 3 is a circuit diagram showing how the principles of this invention may be used to provide either slow operation or slow release of a relay or to provide a pulse generator.

Fig. 3 shows a circuit which combines both the slow-release action and the slow-operate action of the circuits in Figs. 1 and 2.

Fig. 3 is similar to Fig. 2, except that contact 14 is not present, and, instead, contact 16 is connected between base 7 and resistor 15. By means of contact 16, the circuit functions to provide either slow operation or slow release of relay 18. With contact 16 closed, transistor 6 is initially made conductive by the connection of battery 11 in series with resistor 15 and contact 16 to base 7 and emitter 8. Current begins to increase in winding 4, causing an induced voltage in winding 5, which makes transistor 6 less conductive, delaying the build-up of current in winding 4. Eventually enough current builds up in winding 4 to operate the relay. Thus, slow operation of relay 18 is provided with contact 16 closed. On the other hand, when contact 16 is opened, with relay 18 in an operated state, battery 11 and resistor 15 are removed from the circuit, and the circuit now is similar to the circuit for slow release, Fig. 1. A voltage is induced in winding 5 which keeps the transistor conductive and maintains enough current in winding 4 to keep the relay operated for an interval. Thus, slow release of relay 18 is provided with contact 16 open.

Contact 16 may be a contact controlled by the relay itself, in which case this contact is opened and closed by the operation and release of the relay, and a continuous self-interrupting action is obtained. In this case contact 17, also provided on the relay, will furnish a periodically-recurring pulse in an external circuit controlled by that contact.

In an exemplary embodiment of the arrangement disclosed in Figs. 1, 2, and 3, transistor 6 was a 2N141 junction transistor. This transistor was used merely for convenience, and may be replaced by one of a lower power rating without altering the operation of the circuits. Relay 18 had a main winding 4 of 1000 ohms and an auxiliary winding 5 of 100 ohms.

Relay 18 was an ordinary telephone relay, with no attached sleeve, slug, or other built-in appendage to slow the action of the relay.

The embodiment just mentioned provided a release time of approximately 0.9 second, in the circuit according to Fig. 1, with a spring load on the relay which was far heavier than would normally exist in telephone applications. With a lighter spring load, namely, five makes and one break, the release time increased to approximately 1.5 seconds. With the circuit shown in Fig. 2 operate times in the order of 0.5 second were easily obtainable.

The embodiment shown in Fig. 1 may be used advantageously for providing slow-release of a hold relay (B relay) in a switch, such as a selector, in a telephone switch train, for example. In some cases such a hold relay must have an unusually long release time, as, for example, when it is necessary to cover the time allowed for return of a stop dial signal from the remote office when an outgoing trunk is seized.

The embodiment shown in Fig. 3 may be used, for instance, as a master source of pulses in conjunction with busy interrupters, ringing interruption or the like in telephone exchanges.

The invention, however, is not limited to the above embodiments, but may be modified in various ways within the scope of the invention by those skilled in the art. For example, the PNP transistor shown in the figures may be replaced by an NPN transistor, with attendant changes in biasing, and the circuits will continue to operate in the same manner.

What is claimed is:

1. In combination, a relay device having a main winding and an auxiliary winding, a direct current source for energizing said main winding, and a transistor having an input circuit and an output circuit, said main winding being connected in said output circuit in series with said direct current source and said auxiliary winding being connected in said input circuit, with said connections of said windings being of a polarity such that a negative feedback from said output circuit to said input circuit is obtained by induction from said main winding to said auxiliary winding, said negative feedback causing slow action of said relay device.

2. In combination, a relay device having a main winding and an auxiliary winding, a direct current source for energizing said main winding and a transistor for rendering said relay device slow to release, said transistor having an input circuit and an output circuit, said main winding being connected in said output circuit in series with said direct current source and said auxiliary winding being connected in said input circuit, the connections of said windings being of such polarity that a negative feedback from said output circuit to said input circuit is obtained by induction from said main winding to said auxiliary winding and that deenergization of said main winding will induce in said auxiliary winding a voltage tending to render said transistor conductive.

3. The combination as claimed in claim 2, in which is further provided a contact controlling said main winding, the closing of said contact completing a circuit for said main winding and causing the output circuit of said transistor to be shunted, and the opening of said contact causing said shunt to be removed, thereby permitting said transistor to maintain current in said main winding for delaying the release of said relay device.

4. The combination as claimed in claim 2, in which there is further provided in said input circuit a variable resistor for varying the current gain in said transistor and hence varying the time required for action of said relay device.

5. In combination, a relay device having a main winding and an auxiliary winding, a direct current source for energizing said main winding, a transistor having an input circuit, an output circuit and switching means operative to apply to the transistor a direct current potential to bias said transistor for conduction, said main winding being connected in said output circuit in series with said direct current source and said auxiliary winding being connected in said input circuit, the connections of said windings being of such polarity that a negative feedback from said output circuit to said input circuit is obtained by induction from said main winding to said auxiliary winding and such that energization of said main winding will induce in said auxiliary winding a voltage opposing said direct current potential thereby rendering said relay device slow to operate.

6. The combination as claimed in claim 5, wherein said switching means comprises a contact for applying said direct current bias potential and for simultaneously closing the output circuit of said transistor including said main winding.

7. In combination, a relay device having a main winding, an auxiliary winding, and a self-interrupter contact, a direct current source for energizing said main winding and a transistor having an input circuit and an output circuit, said self-interrupter contact being operative on closure to apply to said transistor a direct current potential to bias said transistor for conduction, said main winding being connected in said output circuit in series with said direct current source and said auxiliary winding being connected in said input circuit, with said connections of said windings being of a polarity such that a negative feedback from said output circuit to said input circuit is obtained by induction from said main winding to said auxiliary winding, said negative feedback opposing said direct current bias potential thereby causing periodic, slow action of said relay device under the control of said self-interrupter contact.

8. In combination, a contact, a relay device having a main winding and an auxiliary winding, a direct current source for energizing said main winding and a transistor having an input circuit and an output circuit, said contact being operative on closure to apply to said transistor a direct current potential to bias said transistor for conduction, said main winding being connected in said output circuit in series with said direct current source and said auxiliary winding being connected in said input circuit; the connections of said windings being such that a feedback from said output circuit to said input circuit is obtained by induction from said main winding to said auxiliary winding, such that energization of said main winding will induce in said auxiliary winding a voltage which opposes said direct current bias potential thereby tending to change said transistor from its conductive state to its non-conductive state to cause slow operation of said relay device upon closure of said contact, and that deenergization of said main winding will induce in said auxiliary winding a voltage which tends to change said transistor from its non-conductive state to its conductive state to cause slow release of said relay device upon opening of said contact.

References Cited in the file of this patent

UNITED STATES PATENTS

| | | |
|---|---|---|
| 2,517,242 | Rockafellow | Aug. 1, 1950 |
| 2,577,137 | Low | Dec. 4, 1951 |
| 2,801,374 | Suala | July 30, 1957 |